(12) United States Patent
Coburn, IV

(10) Patent No.: US 9,904,730 B2
(45) Date of Patent: Feb. 27, 2018

(54) QUEUE IDENTIFICATION

(71) Applicant: Sonos, Inc., Santa Barbara, CA (US)

(72) Inventor: Arthur L. Coburn, IV, Lexington, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/244,219

(22) Filed: Aug. 23, 2016

(65) Prior Publication Data

US 2016/0357862 A1    Dec. 8, 2016

Related U.S. Application Data

(63) Continuation of application No. 14/330,856, filed on Jul. 14, 2014, now Pat. No. 9,460,755.

(51) Int. Cl.
*G06F 17/00* (2006.01)
*G06F 17/30* (2006.01)
*G11B 27/10* (2006.01)

(52) U.S. Cl.
CPC ...... *G06F 17/30772* (2013.01); *G11B 27/105* (2013.01)

(58) Field of Classification Search
CPC .......... G11B 27/105; H04N 21/43615; H04N 21/4583; H04N 21/4825; H04N 21/8113; G06F 17/30772
USPC .......................................................... 700/94
See application file for complete search history.

(56) References Cited

U.S. PATENT DOCUMENTS

| 5,406,634 A | 4/1995 | Anderson et al. |
| 5,440,644 A | 8/1995 | Farinelli et al. |
| 5,761,320 A | 6/1998 | Farinelli et al. |
| 5,856,827 A | 1/1999 | Sudo |
| 5,923,902 A | 7/1999 | Inagaki |

(Continued)

FOREIGN PATENT DOCUMENTS

| EP | 1389853 A1 | 2/2004 |
| KR | 20090017795 | 2/2009 |

(Continued)

OTHER PUBLICATIONS

United States Patent and Trademark Office, U.S. Appl. No. 60/490,768, filed Jul. 28, 2003, entitled "Method for synchronizing audio playback between multiple networked devices," 13 pages.

(Continued)

*Primary Examiner* — Hemant Patel
(74) *Attorney, Agent, or Firm* — McDonnell Boehnen Hulbert & Berghoff LLP

(57) ABSTRACT

Example techniques relate to a playback device that facilitates queue identification. In an example implementation, a playback device stores an association between a playback queue and a first application identifier. After storing the association between the playback queue and the first application identifier, the playback device receives, from a first computing device, a first message comprising a second application identifier. The playback device determines that the second application identifier corresponds to the first application identifier, and responsive to determining that the second application identifier corresponds to the first application identifier, transmits, to the first computing device, a queue identifier associated with the playback queue.

20 Claims, 9 Drawing Sheets

(56) References Cited

U.S. PATENT DOCUMENTS

| | | |
|---|---|---|
| 6,002,862 A | 12/1999 | Takaike |
| 6,032,202 A | 2/2000 | Lea et al. |
| 6,181,316 B1 | 1/2001 | Little et al. |
| 6,255,961 B1 | 7/2001 | Van et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,985,694 B1 | 1/2006 | De Bonet et al. |
| 7,017,118 B1 | 3/2006 | Carroll |
| 7,020,048 B2 | 3/2006 | McComas |
| 7,113,833 B1 | 9/2006 | Brown et al. |
| 7,117,451 B2 | 10/2006 | Sielken |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,236,773 B2 | 6/2007 | Thomas |
| 7,295,548 B2 | 11/2007 | Blank et al. |
| 7,312,785 B2 | 12/2007 | Tsuk et al. |
| 7,358,960 B2 | 4/2008 | Mak |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,742,740 B2 | 6/2010 | Goldberg et al. |
| 7,797,446 B2 | 9/2010 | Heller et al. |
| 7,805,682 B1 | 9/2010 | Lambourne |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,103,009 B2 | 1/2012 | McCarty et al. |
| 8,131,390 B2 | 3/2012 | Braithwaite et al. |
| 8,234,395 B2 | 7/2012 | Millington et al. |
| 8,483,853 B1 | 7/2013 | Lambourne |
| 8,918,485 B2 * | 12/2014 | Nathan ............. G11B 19/025 455/426.1 |
| 9,374,607 B2 | 6/2016 | Bates et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2002/0165921 A1 | 11/2002 | Sapieyevski |
| 2002/0178191 A1 | 11/2002 | Sielken |
| 2003/0023741 A1 | 1/2003 | Tomassetti et al. |
| 2003/0157951 A1 | 8/2003 | Hasty |
| 2003/0167318 A1 * | 9/2003 | Robbin ............... G06F 1/1613 709/221 |
| 2003/0198257 A1 | 10/2003 | Sullivan et al. |
| 2003/0210796 A1 | 11/2003 | McCarty et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0086120 A1 * | 5/2004 | Akins, III ............ G11B 27/034 380/240 |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0155072 A1 | 7/2005 | Kaczowka et al. |
| 2005/0166157 A1 | 7/2005 | Ollis et al. |
| 2005/0262253 A1 | 11/2005 | Li et al. |
| 2006/0107237 A1 | 5/2006 | Kim |
| 2006/0168340 A1 | 7/2006 | Heller et al. |
| 2006/0253782 A1 | 11/2006 | Stark et al. |
| 2007/0038999 A1 | 2/2007 | Millington et al. |
| 2007/0142944 A1 | 6/2007 | Goldberg et al. |
| 2007/0288470 A1 | 12/2007 | Kauniskangas et al. |
| 2007/0291404 A1 | 12/2007 | Morse et al. |
| 2008/0005690 A1 | 1/2008 | Van Vugt |
| 2008/0016465 A1 | 1/2008 | Foxenland |
| 2008/0126418 A1 | 5/2008 | Vignoli et al. |
| 2008/0134256 A1 | 6/2008 | Dacosta |
| 2009/0228919 A1 | 9/2009 | Zott et al. |
| 2010/0082731 A1 | 4/2010 | Haughay et al. |
| 2010/0095332 A1 | 4/2010 | Gran et al. |
| 2010/0131567 A1 | 5/2010 | Dorogusker et al. |
| 2010/0284389 A1 | 11/2010 | Ramsay et al. |
| 2011/0179455 A1 | 7/2011 | Thompson |
| 2011/0264732 A1 | 10/2011 | Robbin et al. |
| 2012/0117586 A1 | 5/2012 | McCoy et al. |
| 2012/0185771 A1 | 7/2012 | Rothkopf et al. |
| 2012/0304233 A1 | 11/2012 | Roberts et al. |
| 2013/0174204 A1 | 7/2013 | Coburn, IV et al. |
| 2013/0219274 A1 * | 8/2013 | Svendsen ......... G06F 17/30743 715/716 |
| 2013/0343567 A1 | 12/2013 | Triplett et al. |
| 2014/0176298 A1 | 6/2014 | Kumar et al. |
| 2014/0176299 A1 | 6/2014 | Kumar et al. |
| 2014/0181107 A1 | 6/2014 | Coburn et al. |
| 2014/0181199 A1 | 6/2014 | Kumar et al. |
| 2014/0181654 A1 | 6/2014 | Kumar et al. |
| 2014/0181655 A1 | 6/2014 | Kumar et al. |
| 2014/0181656 A1 | 6/2014 | Kumar et al. |
| 2014/0181997 A1 | 6/2014 | Kumar et al. |

FOREIGN PATENT DOCUMENTS

| | | |
|---|---|---|
| WO | 200147248 | 6/2001 |
| WO | 200153994 | 7/2001 |
| WO | 2003093950 A2 | 11/2003 |

OTHER PUBLICATIONS

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

International Bureau, International Preliminary Report on Patentability, dated Jul. 10, 2014, issued in connection with International Application No. PCT/US2012/071212, filed Dec. 21, 2012, 8 pages.

International Searching Authority, International Search Report dated Sep. 30, 2013, issued in connection with International Patent Application No. PCT/US2013/046383, filed on Jun. 18, 2013, 3 pages.

International Searching Authority, International Search Report, dated Nov. 2, 2015, issued in connection with International Application No. PCT/US2015/040349, filed on Jul. 14, 2015, 3 pages.

(56) References Cited

OTHER PUBLICATIONS

International Searching Authority, Written Opinion, dated Nov. 2, 2015, issued in connection with International Application No. PCT/US2015/040349, filed on Jul. 14, 2015, 5 pages.
International Searching Authority, Written Opinion dated Sep. 30, 2013, issued in connection with International Patent Application No. PCT/US2013/046383, filed on Jun. 18, 2013, 7 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 21, 2016, issued in connection with U.S. Appl. No. 14/330,856, filed Jul. 14, 2014, 6 pages.
Notice of Allowance dated May 24, 2016, issued in connection with U.S. Appl. No. 14/330,856, filed Jul. 14, 2014, 5 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 Retrieved Oct. 14, 2014, 40 pages.
"Welcome. You're watching Apple TV." Apple TV 2nd Generation Setup Guide, Mar. 10, 2011 Retrieved Oct. 16, 2014, 35 pages.
"Welcome. You're watching Apple TV." Apple TV 3rd Generation Setup Guide, Mar. 16, 2012 Retrieved Oct. 16, 2014, 35 pages.

* cited by examiner

QUEUE IDENTIFICATION

CROSS REFERENCE TO RELATED APPLICATIONS

This application claims priority under 35 U.S.C. § 120 to, and is a continuation of, U.S. patent application Ser. No. 14/330,856, filed on Jul. 14, 2014, entitled "Queue Identification," the contents of which are fully incorporated by reference herein.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
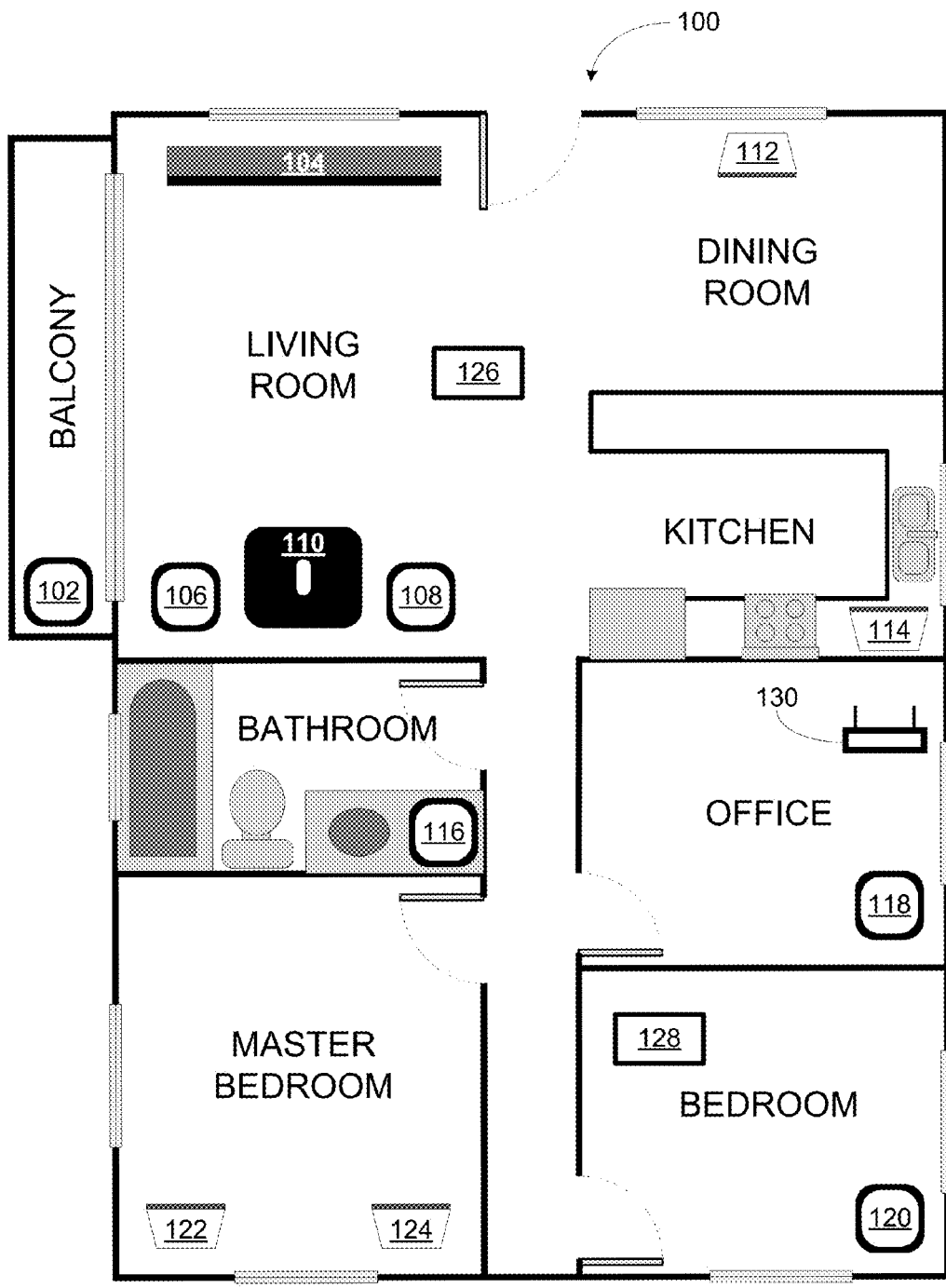
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some situations, a control device of a media playback system may control a playback device of the media playback system by detecting inputs and executing a control application associated with the media playback system. For example, the control device (e.g., a computer, a smartphone, and the like) may detect inputs. Based on the detected inputs, the control device may send a message to the playback device that causes the playback device to access and play back media. Other examples exist.

For instance, a first control application on a first control device may cause the playback device to populate media items of a first playlist into a playback queue accessible to the playback device. Afterward, a second control application on a second control device (or on the first control device) may cause the playback device to overwrite contents of the playback queue with media items of a second playlist. Then, the first control application on the first control device may send a command to the playback device that attempts to manipulate the playback queue as populated by the first control application. However, the media items that the first control application caused to be populated into the playback queue may no longer be populated in the playback queue.

In some cases, interactions of one or more control devices executing one or more control applications to access, alter, or populate a playback queue of the playback device may be enabled by way of application identifiers and queue identifiers. For example, the first control device may send a message to the playback device that (i) identifies the first playlist associated with the first control application and (ii) includes a first application identifier associated with the first control application. The message may cause the playback device to populate the playback queue with media items corresponding to the first playlist and send to the first control device a first queue identifier associated with the populated playback queue.

The second control device may cause the playback device to repopulate the playback queue by sending a message to the playback device that identifies a second playlist associated with the second control application (or alternatively the first control application) and includes a second application identifier (or alternatively the first application identifier). Then, the first control device may send a message to the playback device that includes an application identifier and if the application identifier provided by the first control device is currently associated with the playback queue, the playback device may send to the first control device a queue identifier associated with the playback queue.

Alternatively, if the first control device sends to the playback device an application identifier not associated with the playback queue, then the playback device may send to the first control device an indication that the application identifier is not associated with the playback queue. In this way, if a second control device executing a second control application has taken control of the playback queue or otherwise deleted the originally populated playback queue, the first control device may receive an indication to that effect.

Some examples described herein may involve a playback device receiving one or more messages from a control device. The one or more messages may identify (i) a playlist and (ii) an application identifier associated with an application in use by the control device. Based on receiving the one or more messages, the playback device may populate a playback queue of the playback device with one or more media items associated with the playlist. The playback device may also associate the received application identifier with the playback queue. Additionally, the playback device may send, to the control device, a queue identifier that represents the playback queue.

In one aspect, a method is provided. The method may involve receiving, by a playback device, one or more messages from a control device, where the one or more messages identify (i) a playlist and (ii) an application identifier associated with an application; and based on receiving the one or more messages: populating a playback queue with one or more media items associated with the playlist, where the playback queue is associated with the playback device; associating the received application identifier with the playback queue; and sending, to the control device, a queue identifier that represents the playback queue.

In yet another aspect, a non-transitory computer readable medium is provided. The non-transitory computer readable medium has stored thereon instructions executable by a playback device to cause the playback device to perform functions. The functions include receiving, one or more messages from a control device, where the one or more messages identify (i) a playlist and (ii) an application identifier associated with an application; based on receiving the one or more messages: populating a playback queue with one or more media items associated with the playlist, where the playback queue is associated with the playback device; associating the received application identifier with the playback queue; and sending, to the control device, a queue identifier that represents the playback queue.

In another aspect, a playback device is provided. The playback device includes a processor and a computer readable medium storing instructions that when executed by the playback device cause the playback device to perform functions comprising: receiving one or more messages from a control device, where the one or more messages identify (i) a playlist and (ii) an application identifier associated with an application; and based on receiving the one or more messages: populating a playback queue with one or more media items associated with the playlist, where the playback queue is associated with the playback device; associating the received application identifier with the playback queue; and sending, to the control device, a queue identifier that represents the playback queue.

In yet another aspect, a method is provided. The method includes sending, by a control device, one or more messages to a playback device, where the one or more messages identify (i) a playlist and (ii) an application identifier associated with an application; and receiving, from the playback device, a queue identifier that represents a playback queue of the playback device.

In yet another aspect, a non-transitory computer readable medium is provided. The non-transitory computer readable medium has stored thereon instructions executable by a control device to cause the control device to perform functions. The functions include sending one or more messages to a playback device, where the one or more messages identify (i) a playlist and (ii) an application identifier associated with an application; and receiving, from the playback device, a queue identifier that represents a playback queue of the playback device.

In another aspect, a control device is provided. The control device includes a processor and a computer readable medium storing instructions that when executed by the control device cause the control device to perform functions comprising: sending one or more messages to a playback device, where the one or more messages identify (i) a playlist and (ii) an application identifier associated with an application; and receiving, from the playback device, a queue identifier that represents a playback queue of the playback device.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
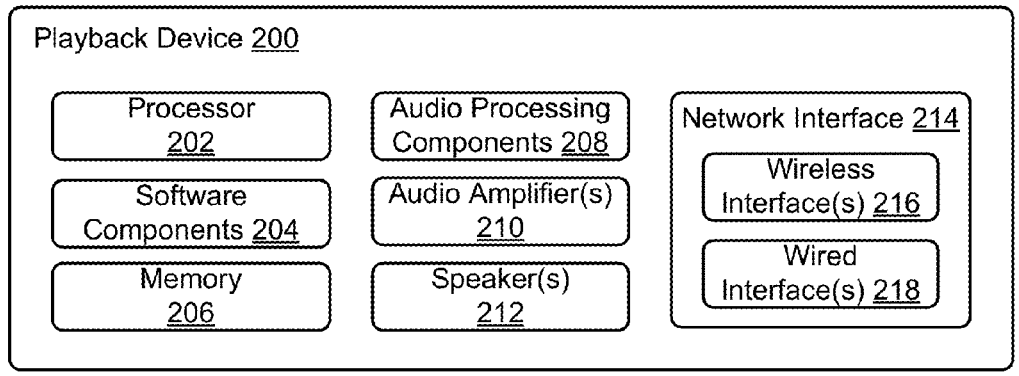
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
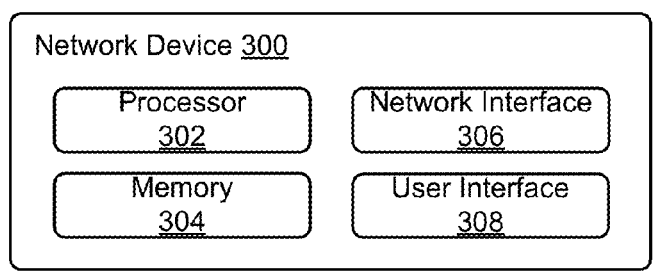
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
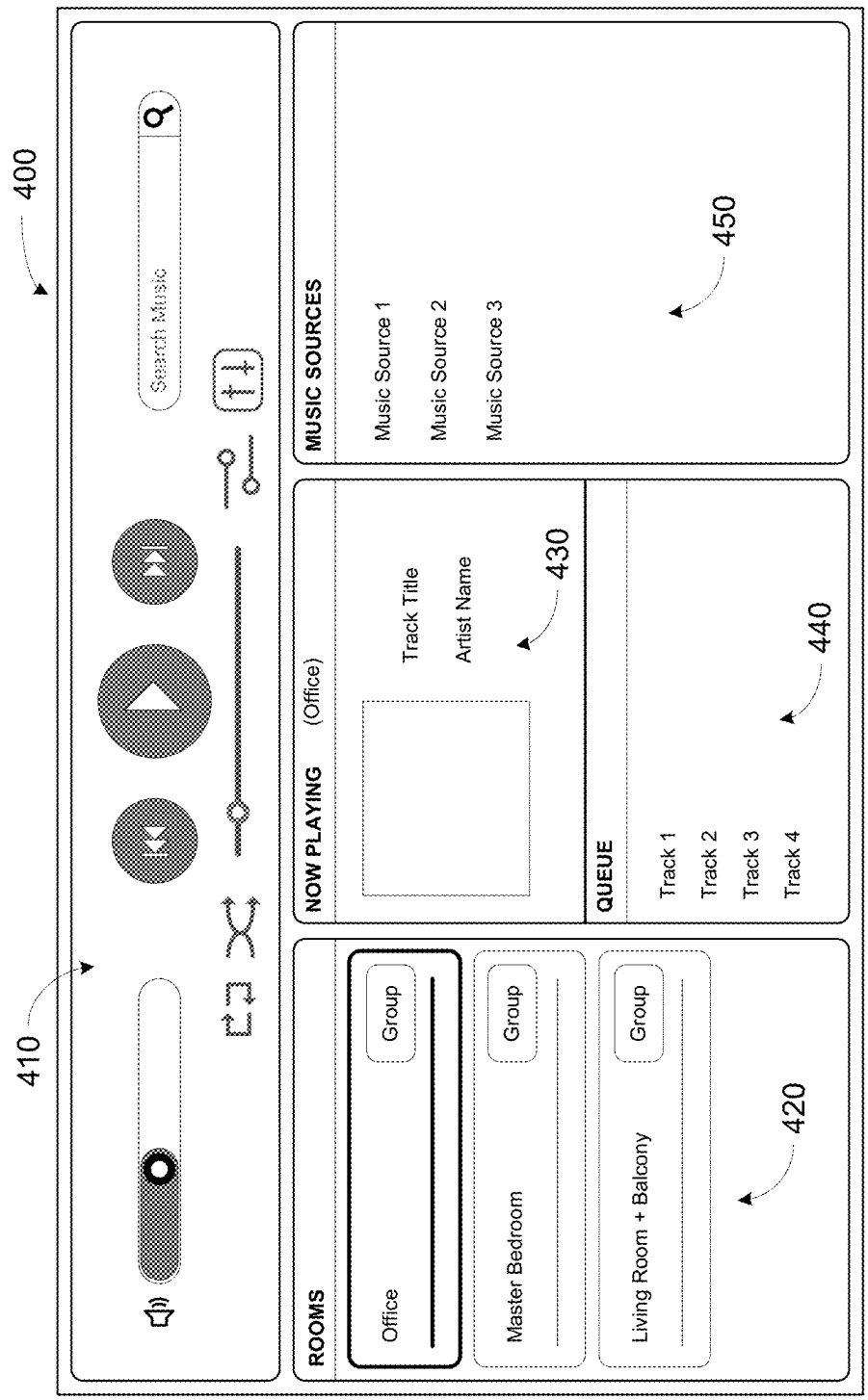
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Controlling a Playback Device

As discussed above, some examples described herein involve, among other things, a playback device receiving one or more messages from a control device. The one or more messages may identify (i) a playlist and (ii) an application identifier associated with an application in use by the control device. Then, based on receiving the one or more messages, the playback device may populate a playback queue of the playback device with one or more media items associated with the playlist. The playback device may also associate the received application identifier with the playback queue. Additionally, the playback device may send, to the control device, a queue identifier that represents the playback queue.

Figure 5:
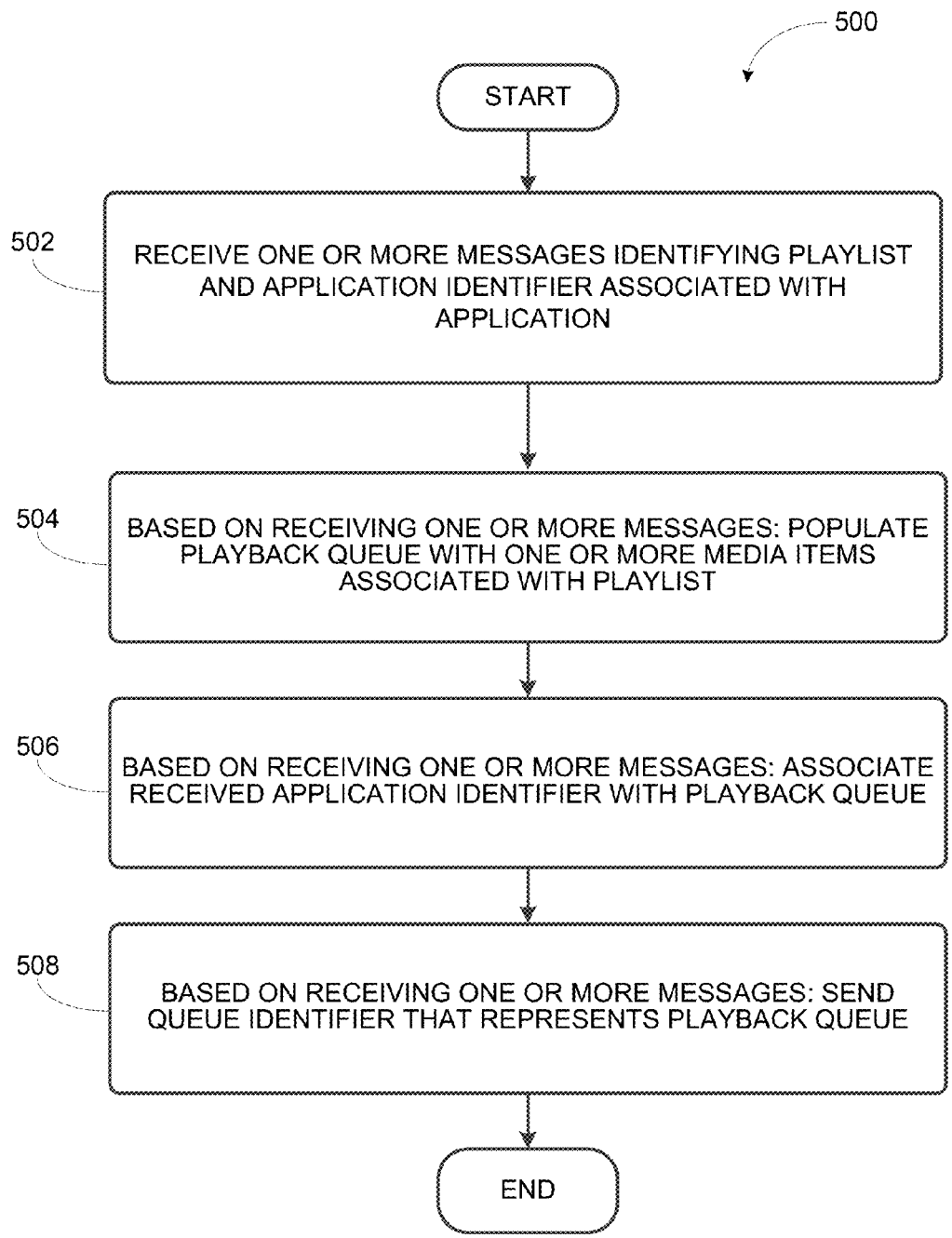
FIG. 5 shows an example flow diagram for an example method.
Figure 14:
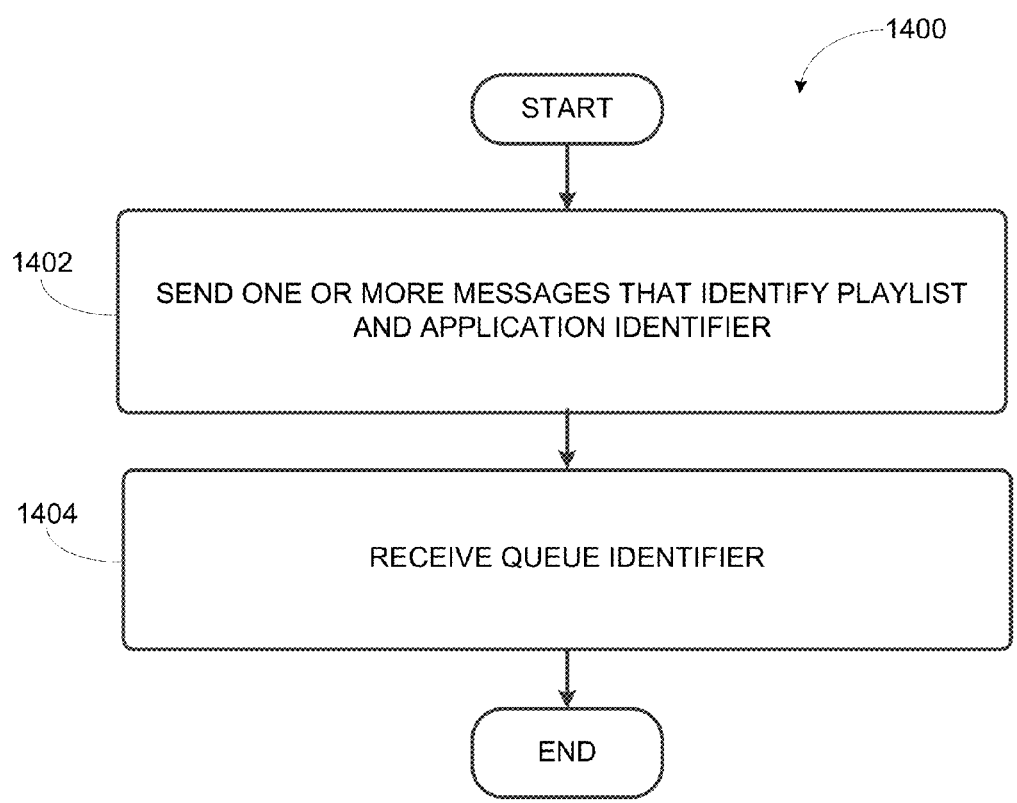
FIG. 14 shows an example flow diagram for another example method.

Methods 500 and 1400 shown respectively in FIGS. 5 and 14 present example methods that can be implemented within an operating environment involving, for example, the media playback system 100 of FIG. 1 and one or more of the playback device 200 of FIG. 2. Methods 500 and 1400 may include one or more operations, functions, or actions as illustrated by one or more of blocks 502-508 and 1402-1404.

Although the blocks of methods 500 and 1400 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500 and 1400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500 and 1400 and other processes and methods disclosed herein, each block in FIG. 5 and FIG. 14 may represent circuitry that is wired to perform the specific logical functions in the process.

At block 502, the method 500 includes receiving, by a playback device, one or more messages from a control device. The one or more messages may identify (i) a playlist and (ii) an application identifier associated with an application. The application (perhaps in use by the control device) may cause the control device to send the one or more messages to the playback device. The one or more messages may represent a command to populate a playback queue at (or accessible to) the playback device with one or more media items of the playlist associated with the application. The application identifier may be included in the one or more messages so that the playback device may associate the playback queue with the application.

Figure 6:
FIG. 6 shows example events and example devices.

Referring to FIG. 6, a playback device 602 may receive one or more messages 610 from a first control device 608A. The one or more messages 610 may include data such as uniform resource identifiers (URIs) or other data representing respective storage locations of audio or video files corresponding to the playlist. In one example, the one or more messages 610 may include messages received sequentially, with each respective message including data corresponding to one audio or video file represented by the playlist. But, data corresponding to multiple audio or videos files represented by the playlist may also be sent simultaneously.

The playback device 602 may retrieve and/or receive the audio or video files associated with the playlist for playback by such data. For instance, the data representing storage locations (e.g., "URI1-URI5") could include IP addresses or domain names of servers storing the audio or video files and/or memory addresses of the audio or video files within various networked storage media. In another example, the one or more messages 610 may include the audio or video files themselves instead of data representing storage locations where the playback device may retrieve the audio or video files. Regardless of the form of playlist-identifying data that may be received as part of the one or more messages 610, the identifying data may be stored at a playback queue 606A of the playback device 602 so that playback of the audio or video files associated with the playlist may be performed by accessing the playback queue 606A.

The application identifier (e.g., "App 1") included within or identified by the one or more messages 610 may be any data that could be used to distinguish one control application executable by the first control device 608A from another control application executable by any other control device (or another control application executable by the first control device 608A). For example, the first control device 608A may send the application identifier in the one or more messages 610 to be received by playback device 602. The application identifier may include a data string such as "App 1" that may identify the application in use by the first control device 608A. In another example, an application identifier that identifies the application could include an arbitrary or random data string such as "D3L1M1D." In some examples, an application identifier may also be referred to as a "Queue Owner ID," or a "QueueOwnerID." Any example application identifier or data string that is distinguishable from other application identifiers and can be associated with a given application is possible. The application identifier (e.g., "App 1") that may be included as part of the received one or more messages 610 may be stored at a memory location 604 of the playback device 602 so that the playback queue 606A may be associated with the control application that caused the playback queue 606A to be created or populated.

Referring back to FIG. 5, at block 504 the method 500 includes, based on receiving the one or more messages, populating a playback queue with one or more media items associated with the playlist. The playback queue is associated with the playback device. Again referring to FIG. 6, the playback queue 606A may represent a memory space physically located at the playback device 602 or at another location accessible by the media playback system that includes the playback device 602 and the first control device 608A. For example, the playback queue 606A may be populated with audio or video files suitable for playback of media corresponding to the playlist. In another example, the playback device 602 may populate or load the playback queue 606A with one or more uniform resource identifiers (e.g., URI1-URI5) that represent respective storage locations of the audio or video files corresponding to the playlist, so that the playback device 602 may use the represented storage locations to retrieve the audio or video files corresponding to the playlist.

Referring back to FIG. 5, at block 506 the method 500 includes, based on receiving the one or more messages, associating the received application identifier with the playback queue. Referring again to FIG. 6, the playback device 602 may store the received application identifier (e.g., "App 1") at a memory location 604 designated for storing an application identifier corresponding to the playback queue 606A. By storing the application identifier in a designated memory location, the stored application identifier may be compared to application identifiers received subsequently from the first control device 608A (or other control devices). Based on comparing subsequently received application identifiers with the stored application identifier that represents the playback queue 606A (or other playback queues), the playback device 602 may allow or deny playback queue access to various control applications being executed by various control devices.

Referring back to FIG. 5, at block 508 the method includes, based on receiving the one or more messages, sending, to the control device, a queue identifier that represents the playback queue. As shown in FIG. 6, the playback device 602 may generate the queue identifier 612A as a data string such as "Q1" and store the queue identifier 612A at memory location 605. However, a queue identifier could include any data that can distinguish a corresponding playback queue. In some examples, the queue identifier may be referred to as a "QueueID," or "Queue ID." After receiving the queue identifier 612A from the playback device 602, the first control device 608A may use the queue identifier 612A to access and/or alter the playback queue 606A represented by the queue identifier 612A.

Figure 7:
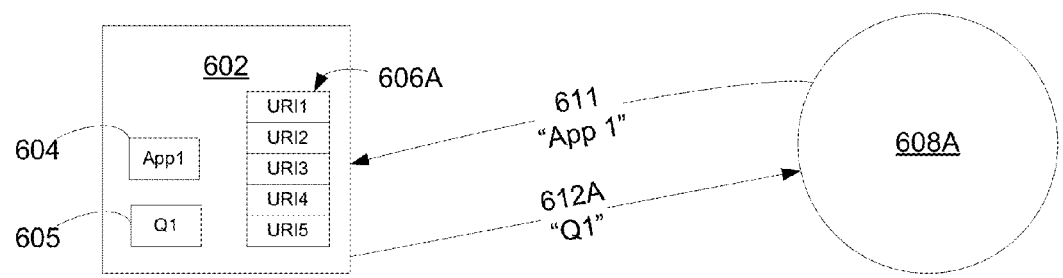
FIG. 7 shows example events and example devices.

Functions that may occur in addition to events depicted in FIG. 6 are shown in FIG. 7. FIG. 7 may depict an "attach" function, where the first control device 608A queries the playback device 602 to determine if the playback queue contains media items compatible with a given control application. (It should be noted that in some examples a playback queue may contain media items compatible with more than one control application so that the playback queue may be associated with one or more application identifier.) After sending the queue identifier, the playback device 602 may receive, from the first control device 608A, an additional message 611 that includes the application identifier (e.g., "App 1"). The playback device 602 may determine that the application identifier included in the additional message 611 is associated with the playback queue 606A. For example, the application identifier included in the additional message 611 may match the application identifier stored at memory location 604 of the playback device 602, or the playback device may otherwise store or access data indicating that the received application identifier is associated with the playback queue 606A. Based on the determination, the playback device 602 may send to the first control device 608A the queue identifier 612A that represents the playback queue 606A. The playback device 602 may also send, to the first control device 608A, an indication that the application identifier included in the additional message 611 is associated with the playback queue 606A (e.g., UPnP error code "0").

Figure 8:
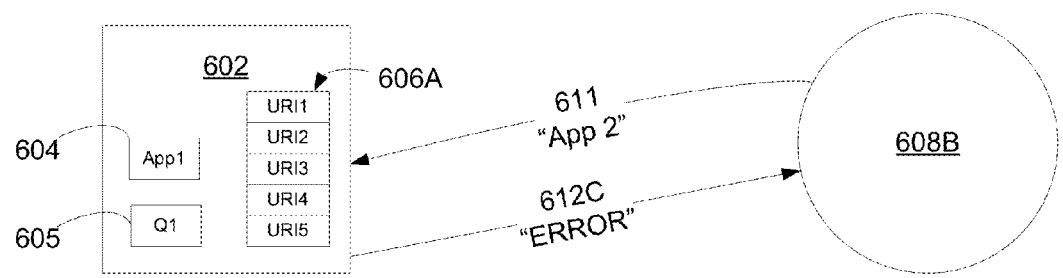
FIG. 8 shows example events and example devices.

Functions that may also occur in addition to functions depicted in FIG. 6 are shown in FIG. 8. FIG. 8 may depict another "attach" action, where a second control device 608B queries the playback device 602 to determine if contents of the playback queue 606A are compatible with a given control application. After sending the queue identifier, the playback device 602 may receive an additional message 611 from the second control device 608B. The additional message 611 may include a second application identifier (e.g., "App 2") that is associated with a second application in use by the second control device 608B. Then, the playback device 602 may determine that the application identifier included in the additional message 611 is not associated with the playback queue 606A. For example, the application identifier included in the additional message (e.g., "App 2") may be compared to the application identifier stored at memory location 604 (e.g., "App 1"), or the playback device 602 may otherwise store or access data indicating that the received application identifier is not associated with the playback queue 606A. Based on the determination, the playback device 602 may send to the second control device 608B an indication 612C that the application identifier included in the additional message 611 is not associated with the playback queue 606A (e.g., UPnP error code "1").

Figure 9A:
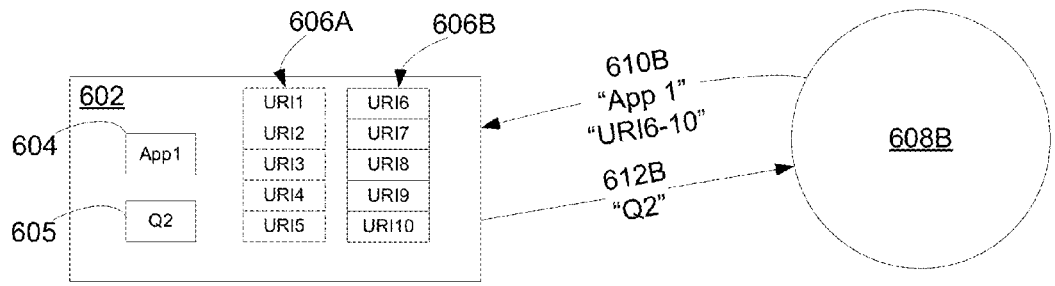
FIG. 9A shows example events and example devices.
Figure 9B:
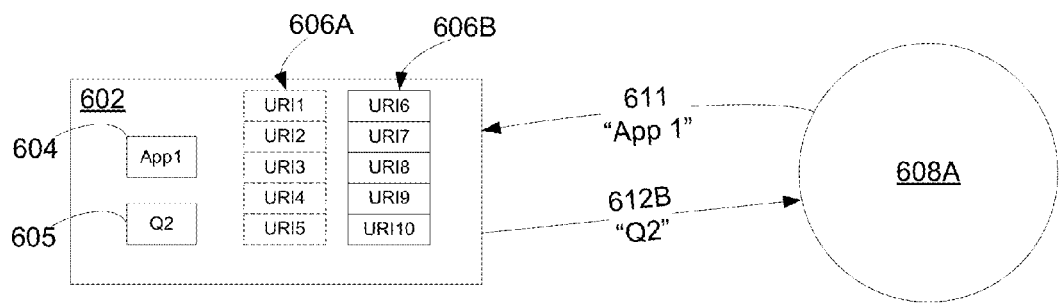
FIG. 9B shows example events and example devices.

Functions that may also occur in addition to functions depicted in FIG. 6 are shown in FIGS. 9A and 9B. FIGS. 9A and 9B may depict a second control device 608B populating a playback queue 606B at the playback device 602 and the first playback device 608A discovering that the playback queue 606B is associated with the first control application (i.e., the first application identifier 611) even though playback queue 606B has been populated by the second control device 608B. (In FIGS. 9A and 9B, the playback queues 606A and 606B may represent the same playback queue, although at 606B updated contents of the playback queue may be depicted and at 606A previous contents of the playback queue may be depicted, for reference.)

As shown in FIG. 9A, after sending the (first) queue identifier the playback device 602 may receive one or more messages 610B from a second control device 608B that cause the playback device 602 to populate the playback queue 606B with one or more media items associated with a second playlist. The one or more media items (e.g., URI6-URI10) associated with the second playlist are associated with the application, perhaps in use by the second control device, and may be included in the one or more messages 610B. The one or more messages 610B may also include the application identifier (e.g., "App 1"). The playback device 602 may associate the application identifier with the playback queue 606B. For example, the application identifier (e.g., "App 1") may be stored at memory location 604 for future comparison with received application identifiers. The playback device 602 may also send the second queue identifier 612B (e.g., "Q2") to the second control device 608B.

As shown in FIG. 9B, the playback device 602 may then receive from the first control device 608A an additional message 611 that includes the application identifier (e.g., "App 1") and determine that the application identifier included in the additional message 611 is associated with the playback queue 606B. For example, the playback device 602 may compare the application identifier stored at memory location 604 with the application identifier included in the additional message 611 or the playback device 602 may otherwise store or access data indicating that the received application identifier is associated with the playback queue 606B. Finally, based on the determination, the playback device 602 may send to the first control device 608A a second queue identifier 612B (e.g., "Q2") that represents the playback queue 606B. The playback device 602 may also send, to the first control device 608A, an indication that the application identifier included in the additional message 611 is associated with the playback queue 606B (e.g., UPnP error code "0").

Figure 10:
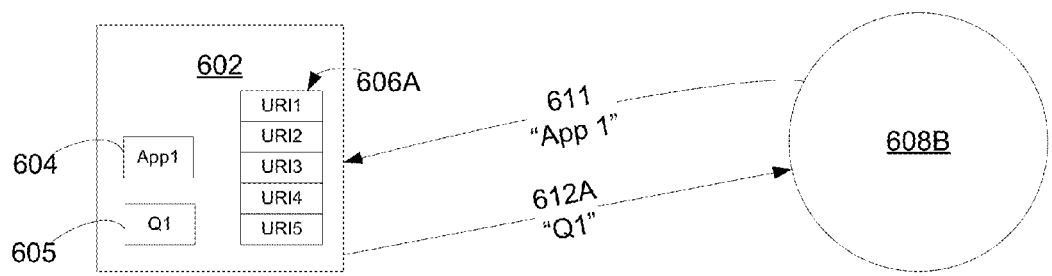
FIG. 10 shows example events and example devices.

Functions that may also occur in addition to events depicted in FIG. 6 are shown in FIG. 10. FIG. 10 may depict a second control device 608B using the (first) control application to discover a compatible playback queue at the playback device 602. (It should be noted that within various examples, multiple control devices may use respective instances of the same controller application. Herein, description of multiple control devices running the same control application should not be interpreted to mean that the control devices are running the control application in concert or in a dual-processor configuration, unless context clearly dictates otherwise.) After sending the queue identifier, the playback device 602 may receive, from the second control device 608B, an additional message 611 that includes the application identifier (e.g., "App 1"). The playback device 602 may then determine that the application identifier included in the additional message 611 is associated with the playback queue 606A. Based on the determination, the playback device 602 may send to the second control device 608B the queue identifier 612A (e.g., "Q1") that represents the playback queue 606A. The playback device 602 may also send, to the second control device 608B, an indication that the application identifier included in the additional message 611 is associated with the playback queue 606A (e.g., UPnP error code "0").

Figure 11:
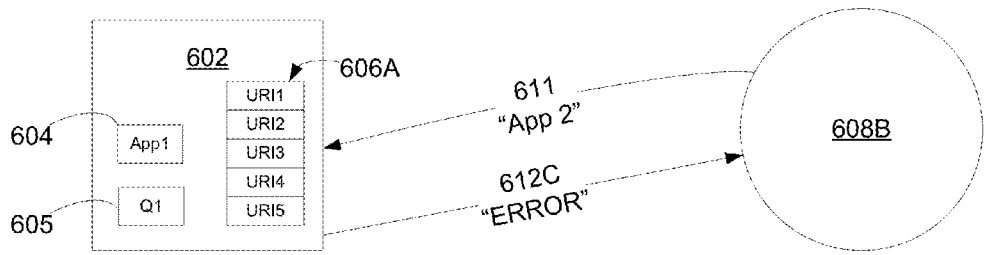
FIG. 11 shows example events and example devices.

Functions that may also occur in addition to events depicted in FIG. 6 are shown in FIG. 11. FIG. 11 may depict a second control device 608B using a second control application to discover that the playback queue 606A at the playback device 602 is not compatible with the second control application. After sending the queue identifier, the playback device 602 may receive, from the second control device 608B, an additional message 611 that includes a second application identifier (e.g., "App 2") associated with a second application in use by the second control device 608B. Next, the playback device 602 may determine that the application identifier included in the additional message 611 is not associated with the playback queue 606A. For instance, the playback device 602 may compare the application identifier included in the additional message 611 with the application identifier stored at memory location 604. Based on the determination, the playback device 602 may send to the second control device 608B an indication 612C that the application identifier included in the additional message 611 is not associated with the playback queue 606A (e.g., UPnP error code "0").

Figure 12A:
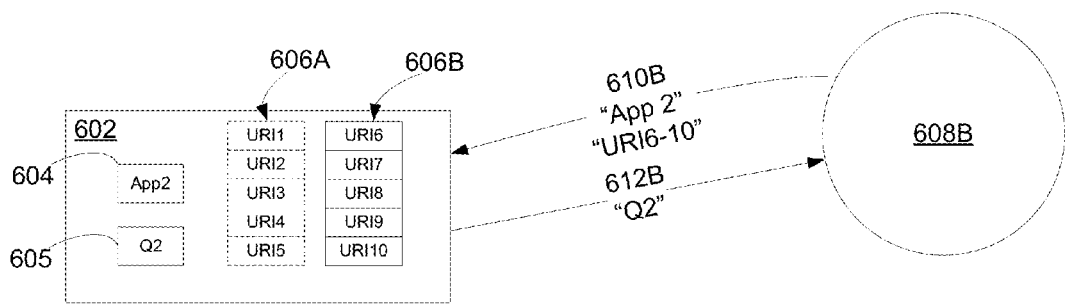
FIG. 12A shows example events and example devices.
Figure 12B:
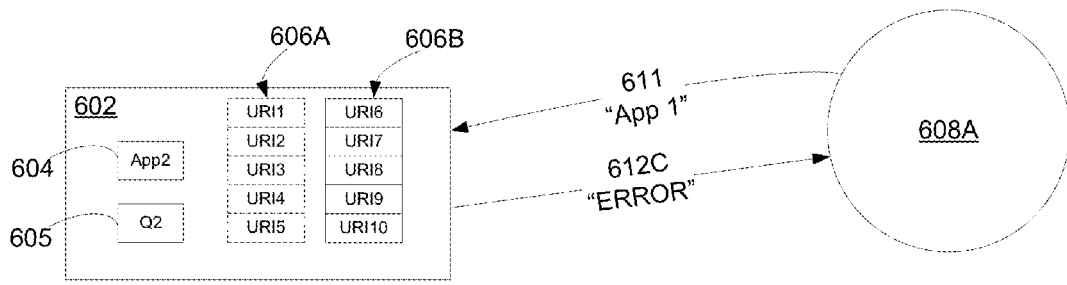
FIG. 12B shows example events and example devices.

Functions that may also occur in addition to events depicted in FIG. 6 are shown in FIGS. 12A and 12B. FIGS. 12A and 12B depicts a second control device 608B populating playback queue 606B by way of a second control application, and the first control device 608A discovering that the playback queue 606B is not compatible with the first control application. (In FIGS. 12A and 12B, the playback queues 606A and 606B may represent the same playback queue, although at 606B updated contents of the playback queue may be depicted and at 606A previous contents of the playback queue may be depicted, for reference.)

As shown in FIG. 12A, after sending the queue identifier the playback device 602 may receive, from the second control device 608B, one or more messages 610B that cause the playback device 602 to populate playback queue 606B with one or more media items associated with a second playlist. The one or more messages 610B may include one or more media items (e.g., URI6-URI10) associated with the second playlist associated with a second application in use by the second control device 608B. The one or more messages 610B received from the second control device 608B may also include a second application identifier (e.g., "App 2") associated with the second application. Next, the playback device 602 may associate the received second application identifier with the playback queue 606B. For example, the application identifier included in the one or more messages 610B may be stored at memory location 604. The playback device 602 may then send a second queue identifier 612B (e.g., "Q2") to the second control device 608B. The playback device 602 may also send, to the second control device 608B, an indication that the application identifier included in the additional message 611 is associated with the playback queue 606B (e.g., UPnP error code "0").

Then, as shown in FIG. 12B, the playback device 602 may receive, from the first control device 608A, an additional message 611 that includes the first application identifier (e.g., "App 1"). The playback device 602 may determine that the application identifier included in the additional message 611 is not associated with the playback queue 606B and, based on the determination, send to the first control device 608A an indication 612C that the first application identifier included in the additional message 611 is not associated with the playback queue 606B (e.g., UPnP error code "0").

Figure 13A:
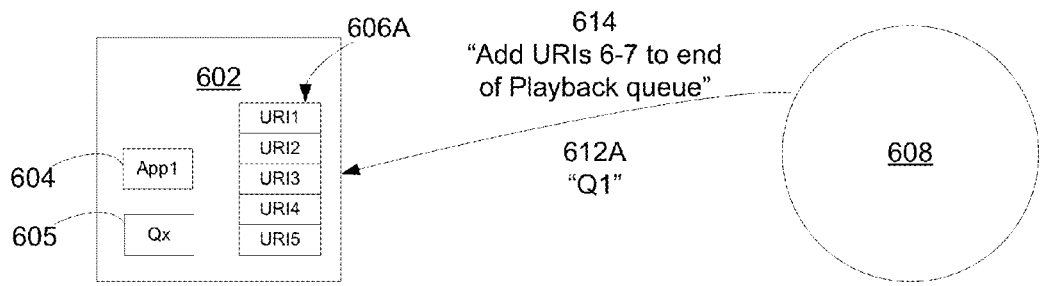
FIG. 13A shows example events and example devices.
Figure 13B:
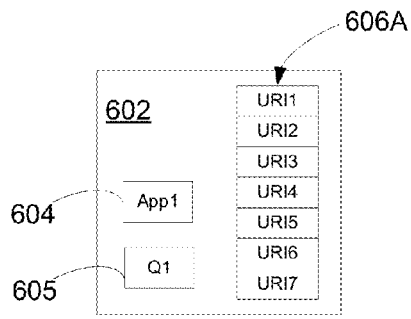
FIG. 13B shows an example device.
Figure 13C:
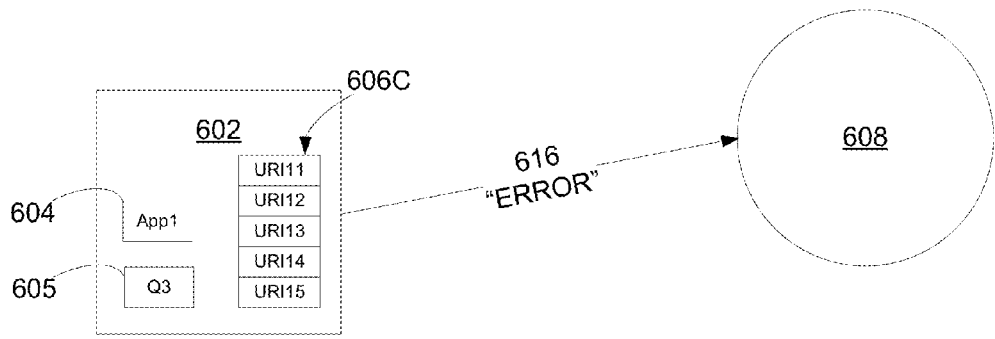
FIG. 13C shows example events and example devices.

Functions that may also occur in addition to events depicted in FIG. 6 are shown in FIGS. 13A, 13B, 13C. FIG. 13A depicts a control device 608 using the queue identifier 612 (e.g., "Q1") to access or alter the playback queue 606A. FIG. 13B depicts the playback queue 606A after the control device 608 has altered the playback queue 606A. FIG. 13C depicts a control device 608 discovering that the provided queue identifier no longer represents a playback queue stored at the playback device 602.

As shown in FIG. 13A, the playback device 602 may receive an additional message 614 from the control device 608 that includes (i) a command to alter the playback queue 606A and (ii) the queue identifier 612 (e.g., "Q1") that represents the playback queue 606A. Here, the control device 608 may be the first control device 608A or any other control device of the media playback system. In one situation, the additional message 614 may include a command to add URIs 6-7 to the end of playback queue 606A.

Based on receiving the additional message 614 from the control device 608, the playback device 602 may determine that the received queue identifier 612A represents the playback queue 606A. For instance, the playback device 602 may compare the received queue identifier 612A to a queue identifier stored in a memory location 605 of the playback device 602. The queue identifier (e.g., "Q1") stored at the memory location 605 may be known to represent the playback queue 606A. If the queue identifier stored at the memory location 605 matches the received queue identifier 612A or the playback device 602 otherwise determines that the received queue identifier 612A represents the playback queue 606A, the playback device 602 may, based on the determination, alter the playback queue 606A according to the command and/or additional message 614. This result is depicted in FIG. 13B, as the playback queue 606A includes URI6-URI7 at the end of the playback queue 606A.

However, as depicted in FIG. 13C, if the queue identifier stored at memory location 605 (e.g., "Q3") does not match the received queue identifier 612A, the playback device 602 may determine that the received queue identifier does not represent the playback queue 606C and send to the control device 608 an indication 616 that the received queue identifier 612A does not represent the playback queue 606C or that the received queue identifier 612A is not associated with the playback queue 606C. FIG. 13C may depict a scenario where another control device has deleted the playback queue 606A and created the playback queue 606C before the playback device 602 receives the additional message 614.

It should be noted that any of the functions depicted in FIGS. 6-13C may be carried out concurrently, contemporaneously, or sequentially in any possible sequence.

Referring now to FIG. 14, at block 1402 the method 1400 includes sending, by a control device, one or more messages to a playback device, where the one or more messages identify (i) a playlist and (ii) an application identifier associated with an application. For example, at FIG. 6, a control device 608A sends one or more messages 610 to a playback device 602. The one or more messages 610 may include an application identifier such as a data string "App 1" and may include data storage locations of audio or video files associated with the playlist, such as a data string that includes uniform resource identifiers URI1-URI5.

At block 1404, the method 1400 includes receiving, from the playback device, a queue identifier that represents a playback queue of the playback device. For example, the control device 608A of FIG. 6 receives the queue identifier 612A (e.g., "Q1") that represents the playback queue 606A.

As one with skill in the art will appreciate, any of the functions described above as being performed by a playback device may correspond to a related function that may be performed by a control device. In some examples, any data, message, command, or instruction received by a playback device may be sent to the playback device by the control device. Also, any data, message, command, or instruction sent by a playback device may be received by the control device.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Some examples described herein involve, among other things, a playback device receiving one or more messages from a control device. The one or more messages may identify (i) a playlist and (ii) an application identifier associated with an application in use by the control device. Then, based on receiving the one or more messages, the playback device may populate a playback queue of the playback device with one or more media items associated with the playlist. The playback device may also associate the received application identifier with the playback queue. Additionally, the playback device may send, to the control device, a queue identifier that represents the playback queue.

In one aspect, a method is provided. The method may involve receiving, by a playback device, one or more messages from a control device, where the one or more messages identify (i) a playlist and (ii) an application identifier associated with an application; and based on receiving the one or more messages: populating a playback queue with one or more media items associated with the playlist, where the playback queue is associated with the playback device; associating the received application identifier with the playback queue; and sending, to the control device, a queue identifier that represents the playback queue.

In yet another aspect, a non-transitory computer readable medium is provided. The non-transitory computer readable medium has stored thereon instructions executable by a playback device to cause the playback device to perform functions. The functions include receiving, one or more messages from a control device, where the one or more messages identify (i) a playlist and (ii) an application identifier associated with an application; based on receiving the one or more messages: populating a playback queue with one or more media items associated with the playlist, where the playback queue is associated with the playback device; associating the received application identifier with the playback queue; and sending, to the control device, a queue identifier that represents the playback queue.

In another aspect, a playback device is provided. The playback device includes a processor and a computer readable medium storing instructions that when executed by the playback device cause the playback device to perform functions comprising: receiving one or more messages from a control device, where the one or more messages identify (i) a playlist and (ii) an application identifier associated with an application; and based on receiving the one or more messages: populating a playback queue with one or more media items associated with the playlist, where the playback queue is associated with the playback device; associating the received application identifier with the playback queue; and sending, to the control device, a queue identifier that represents the playback queue.

In yet another aspect, a method is provided. The method includes sending, by a control device, one or more messages to a playback device, where the one or more messages identify (i) a playlist and (ii) an application identifier associated with an application; and receiving, from the playback device, a queue identifier that represents a playback queue of the playback device.

In yet another aspect, a non-transitory computer readable medium is provided. The non-transitory computer readable medium has stored thereon instructions executable by a control device to cause the control device to perform functions. The functions include sending one or more messages to a playback device, where the one or more messages identify (i) a playlist and (ii) an application identifier associated with an application; and receiving, from the playback device, a queue identifier that represents a playback queue of the playback device.

In another aspect, a control device is provided. The control device includes a processor and a computer readable medium storing instructions that when executed by the control device cause the control device to perform functions comprising: sending one or more messages to a playback device, where the one or more messages identify (i) a playlist and (ii) an application identifier associated with an application; and receiving, from the playback device, a queue identifier that represents a playback queue of the playback device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   storing, via a playback device, an association between a playback queue and a first application identifier, wherein the playback queue comprises one or more media items;
   after storing the association between the playback queue and the first application identifier, receiving, via the playback device from a first computing device, a first message comprising a second application identifier;
   determining, via the playback device, that the second application identifier corresponds to the first application identifier; and
   responsive to determining that the second application identifier corresponds to the first application identifier, transmitting, via the playback device to the first computing device, a queue identifier associated with the playback queue.

2. The method of claim 1, further comprising:
   receiving, via the playback device from the first computing device, a second message comprising (i) a command to alter the playback queue and (ii) a second queue identifier.

3. The method of claim 2, wherein the command to alter the playback queue comprises:
   a command to add one or more additional media items to the playback queue.

4. The method of claim 3, wherein the command to add the one or more additional media items to the playback queue comprises:

a command to add one or more identifiers associated with the one or more additional media items to the playback queue.

5. The method of claim 2, further comprising:
  determining that the second queue identifier matches the queue identifier associated with the playback queue; and
  responsive to determining that the second queue identifier matches the queue identifier associated with the playback queue, altering the playback queue according to the command.

6. The method of claim 2, further comprising:
  determining that the second queue identifier does not match the queue identifier associated with the playback queue; and
  transmitting, to the first computing device, an indication that the second queue identifier does not match the queue identifier associated with the playback queue.

7. The method of claim 1, wherein receiving, via the playback device from the first computing device, the first message comprising the second application identifier comprises:
  after storing the association between the playback queue and the first application identifier, receiving, via the playback device from the first computing device over a local area network (LAN), the first message comprising the second application identifier.

8. The method of claim 1, wherein storing the association between the playback queue and the first application identifier comprises:
  storing, in a memory of the playback device, the association between the playback queue and the first application identifier.

9. A tangible, non-transitory computer-readable medium storing instructions that when executed by a processor cause a playback device to perform functions comprising:
  storing an association between a playback queue and a first application identifier, wherein the playback queue comprises one or more media items;
  after storing the association between the playback queue and the first application identifier, receiving, from a first computing device, a first message comprising a second application identifier;
  determining that the second application identifier corresponds to the first application identifier; and
  responsive to determining that the second application identifier corresponds to the first application identifier, transmitting, to the first computing device, a queue identifier associated with the playback queue.

10. The tangible, non-transitory computer-readable medium of claim 9, wherein the functions further comprise:
  receiving, from the first computing device, a second message comprising (i) a command to alter the playback queue and (ii) a second queue identifier.

11. The tangible, non-transitory computer-readable medium of claim 10, wherein the command to alter the playback queue comprises:
  a command to add one or more identifiers associated with one or more additional media items to the playback queue.

12. The tangible, non-transitory computer-readable medium of claim 10, wherein the functions further comprise:
  determining that the second queue identifier matches the queue identifier associated with the playback queue; and
  based on the determining, altering the playback queue according to the command.

13. The tangible, non-transitory computer-readable medium of claim 10, wherein the functions further comprise:
  determining that the second queue identifier does not match the queue identifier associated with the playback queue; and
  transmitting, to the first computing device, an indication that the second queue identifier does not match the queue identifier associated with the playback queue.

14. The tangible, non-transitory computer-readable medium of claim 9, wherein receiving the first message comprising the second application identifier comprises:
  after storing the association between the playback queue and the first application identifier, receiving, from the first computing device over a local area network (LAN), the first message comprising the second application identifier.

15. The tangible, non-transitory computer-readable medium of claim 9, wherein storing the association between the playback queue and the first application identifier comprises:
  storing, in a memory of the playback device, the association between the playback queue and the first application identifier.

16. A playback device, comprising:
  a processor; and
  memory storing instructions that when executed by the processor cause the playback device to perform functions comprising:
    storing an association between a playback queue and a first application identifier, wherein the playback queue comprises one or more media items;
    after storing the association between the playback queue and the first application identifier, receiving, from a first computing device, a first message comprising a second application identifier;
    determining that the second application identifier corresponds to the first application identifier; and
    responsive to determining that the second application identifier corresponds to the first application identifier, transmitting, to the first computing device, a queue identifier associated with the playback queue.

17. The playback device of claim 16, wherein the functions further comprise:
  receiving, from the first computing device, a second message comprising (i) a command to alter the playback queue and (ii) a second queue identifier.

18. The playback device of claim 17, wherein the functions further comprise:
  determining that the second queue identifier matches the queue identifier associated with the playback queue; and
  based on the determining, altering the playback queue according to the command.

19. The playback device of claim 16, wherein storing the association between the playback queue and the first application identifier comprises:
  storing, in a memory of the playback device, the association between the playback queue and the first application identifier.

20. The playback device of claim 16, wherein receiving the first message comprising the second application identifier comprises:
  after storing the association between the playback queue and the first application identifier, receiving, from the first computing device over a local area network (LAN), the first message comprising the second application identifier.

\* \* \* \* \*